United States Patent [19]

Oshikata et al.

[11] Patent Number: 4,782,514

[45] Date of Patent: Nov. 1, 1988

[54] KEY TELEPHONE SYSTEM

[75] Inventors: Hironobu Oshikata; Hiroshi Fukushima; Teruo Matsufuji, all of Tokyo, Japan

[73] Assignee: Iwatsu Electric Co., Ltd., Tokyo, Japan

[21] Appl. No.: 55,245

[22] Filed: May 28, 1987

[30] Foreign Application Priority Data

Jun. 5, 1986 [JP] Japan ................... 61-129143

[51] Int. Cl.$^4$ ........................................... H04M 3/00
[52] U.S. Cl. ..................................... 379/165; 379/156
[58] Field of Search ................ 379/94, 157, 164, 165, 379/166, 201, 269, 156; 364/200 MS File, 900 MS File

[56] References Cited

U.S. PATENT DOCUMENTS

| | | | |
|---|---|---|---|
| 3,643,219 | 2/1972 | Heimann | 364/200 |
| 3,940,568 | 2/1976 | Rutkowski et al. | 379/269 X |
| 4,136,263 | 1/1979 | Williams | 379/165 X |
| 4,440,986 | 4/1984 | Thorson | 379/94 |
| 4,506,346 | 3/1985 | Bennett et al. | 379/166 X |
| 4,536,621 | 8/1985 | Bergen et al. | 379/166 X |
| 4,627,046 | 12/1986 | Bellamy | 379/284 X |
| 4,703,416 | 10/1987 | Crupi et al. | 379/157 |

OTHER PUBLICATIONS

Nirenberg, "Microelectronic Future for Keyphone and PABX Components", Telecommunications, Jun.-1976, pp. 35-38.

Wellenstein, "LSI Yields High Reliability", IEEE Spectrum, Oct. 1979, pp. 78-81.

Terai, "EK-50 Key Telephone System", Japan Telecommunications Review, Jan. 1981, pp.20-23.

*Primary Examiner*—Keith E. George
*Attorney, Agent, or Firm*—Kinney & Lange

[57] ABSTRACT

A key telephone system comprising a key service unit and key telephone sets is configured by the present invention so that system data are registered in an IC card and the system data so registered are fed to the key service unit by the insertion of the IC card in the key service unit.

2 Claims, 7 Drawing Sheets

FIG. 9

ADDRESS (HEXA-DECIMAL)    DATA (HEXA-DECIMAL)

```
     (BIT)  7   6   5   4   3   2   1   0
          ┌───┬───┬───┬───┬───┬───┬───┬───┐
1000      │ 0 │ 0 │ 0 │ 0 │ 0 │ 1 │ 1 │ 1 │
          └─┬─┴─┬─┴───┴───┴───┴─┬─┴─┬─┴─┬─┘
            ↓   ↓               ↓   ↓   ↓
           KT8 KT7  ──────────  KT2 KT1
```

```
     (BIT)  7   6   5   4   3   2   1   0
          ┌───┬───┬───┬───┬───┬───┬───┬───┐
1001      │ 0 │ 0 │ 0 │ 0 │ 0 │ 0 │ 0 │ 0 │
          └─┬─┴─┬─┴───┴───┴───┴───┴─┬─┴─┬─┘
            ↓   ↓                   ↓   ↓
          KT16 KT15 ──────────  KT10 KT9
```

```
     (BIT)  7   6   5   4   3   2   1   0
          ┌───┬───┬───┬───┬───┬───┬───┬───┐
1008      │ 0 │ 0 │ 0 │ 0 │ 0 │ 0 │ 0 │ 0 │
          └─┬─┴─┬─┴───┴───┴───┴───┴─┬─┴─┬─┘
            ↓   ↓                   ↓   ↓
          KT72 KT71 ──────────  KT66 KT65
```

KEY TELEPHONE SYSTEM

BACKGROUND OF THE INVENTION

1. Field of the Invention

This invention relates to a key telephone system and more particularly to a key telephone system so configured that registration of system data in a key service unit or alteration of system data are effected easily.

2. Description of the Prior Art

The conventional key telephone system, as widely known, comprises a key service unit and a plurality of key telephone sets connected to the key service unit through connecting cables. In recent years, adoption of electronic devices in the key telephone systems of this class has advanced to a point where their key service units incorporate therein, as a control circuit, a microcomputer (CPU) adapted to effect various controls.

This electronic control circuit is composed of a control circuit (CPU), a read-only memory (ROM) serving to provide the control circuit (CPU) with a program, a random access memory (RAM) functioning to store necessary data and specifying work areas, and various buses such as data bus, address bus, and control lines.

In the key telephone system of the kind incorporating electronic devices as described above, various data are transmitted and received during the transfer of information between the key service unit and the individual key telephone sets. Broadly, these data are classified as being one of the following three kinds.

(1) Control data (control program data) based on the programs forming the foundation of a given system which are of a permanent nature.

(2) General system data established for a given system based on such system functions as setting telephone sets so as to be capable of issuing a sound on reception of a call, setting the dial pattern (DP/MF) of an office line introduced to the key service unit, and setting calender and clock (hereinafter referred to as "system data").

(3) Individual system data established by, and subject to change by, an individual user in conformity with conditions of use, places of installation, and methods of use on the part of the user, as in assigning numbers (such as *01) for abbreviated dialing, setting dial data corresponding to the assigned numbers, and setting the day-night switch of service class, for example (hereinafter referred to as "user data").

The control data are characteristic of a given system and absolutely invariable. They are fixed in form at the time that the system is shipped as a product from the factory. The system data are such that when a user places an order for a key telephone system including a specification for example such that all the key telephone sets are to be adapted to issue a sound on reception of a call, the data are established to conform with the user's order at the time that the system is shipped as a product or at the time that the system is installed in the user's office. The user data are such that, after the system has been installed at a user's office, the data can be freely altered to suit the user's own convenience at any time he pleases.

It has been customary in the conventional key telephone system of this class to have data concerning functions, i.e. system data such as the kind of system, data established to control system functions (system constants) and data with information on the classification of circuits, registered in a random access memory RAM.

When the system data are required to be altered or re-registered during the use of the key telephone system, the person handling the system is required to stop the operation of the system temporarily and then proceed to effect the alteration or re-registration of system data.

As described above, tne conventional key telephone system has entailed the disadvantage that numerous pieces of system data must be registered one by one after the work of wire distribution is completed and, therefore, the registration of system data consumes much time. When the system data are required to be altered or re-registered while the key telephone system is in use, the key telephone system must be temporarily stopped to permit the alteration or re-registration of system data. If this stop of the key telephone system is protracted, it will inconvenience the user's business operation.

Further, when a static RAM is employed as the RAM mentioned above, the system requires use of a backup battery for protection of data during possible power failure. The incorporation of this battery proves costly when the RAM data capacity is large and, as a natural consequence, the battery is required to have a large capacity.

SUMMARY OF THE INVENTION

An object of this invention is to provide a key telephone system which is liberated from the drawbacks of the conventional technique mentioned above and which permits registration of system data in a key service unit and alteration of the registered system data to be effected simply and quickly and need no backup battery.

For the solution of the drawbacks mentioned above, this invention contemplates a key telephone system comprising a key service unit and key telephone sets, which key telephone system is characterized by further comprising an IC card having system data registered and an IC card connector connected to an address bus, a data bus, and a control line of the key service unit and fixed in position within the key service unit thereby enabling the system data in the IC card to be supplied to the key service unit.

BRIEF DESCRIPTION OF THE DRAWINGS

FIG. 9 is an explanatory diagram of typical system data to be registered in the IC card.

DETAILED DESCRIPTION OF THE PREFERRED EMBODIMENTS

Now, one embodiment of this invention will be described in detail below with reference to the accompanying drawings.

Figure 1:
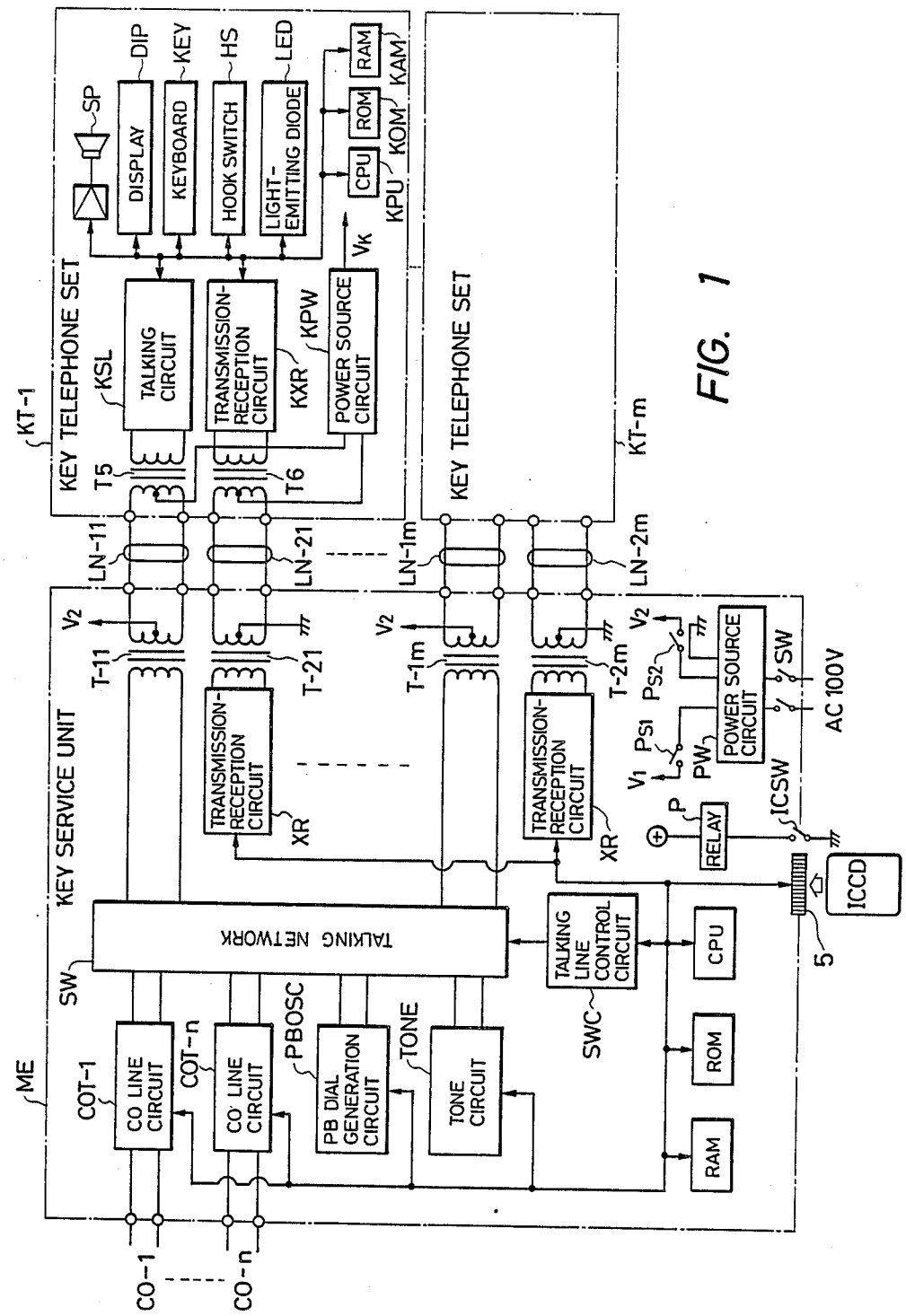
FIG. 1 is a block diagram illustrating one embodiment of this invention

FIG. 1 is a block diagram illustrating the entire configuration of the key telephone system of the present invention. In this diagram, ME stands for a key service unit, KT-1, ..., KT-m each stands for a key telephone set, CO-1, ..., CO-n each stands for a station line, LN-11, LN-21, ..., LN-1m, LN-2m each stands for a cable for connecting the key service unit ME and the key telephone sets KT-1, ..., KT-m.

In this diagram, the internal construction of the key telephone set KT-m is omitted from illustration because it is the same as that of the key telephone set KT-1.

The key service unit ME is provided with CO line circuit COT each connected to station lines CO and a talking network SW which discharges the function of connecting the station lines CO, and a tone circuit TONE serving to generate dial tones and station incoming rings, to the key telephone sets KT, and connecting a PB dial generation circuit PBOSC for feeding out PB dial data to the CO line circuits COT. The key service unit ME is also comprised of a control circuit CPU serving to control the talking network SW through the medium of a talking line control circuit SWC, to control receive incoming data from the CO line circuits COT, and control the operation of the CO line circuits COT. It also comprises a read-only memory ROM for providing a program to the control circuit CPU, a random access memory RAM keeping record of necessary data, a transmission-reception circuit XR effecting exchange of signals with various key telephone sets KT, and a plurality of transformers T.

A power source circuit PW is meant to serve for the key service unit ME and adapted to supply electric power to the key telephone system when an IC card ICCD containing an integrated circuit is inserted into the connector 5 of the key service unit ME. To be specific, when the IC card ICCD is inserted in the connector 5, a switch ICSW disposed inside the connector 5 is turned on and the P relay is turned on. As the result, the contacts $P_{S1}$ and $P_{S2}$ are made to feed output voltages $V_1$ and $V_2$ to the various parts of the key service unit ME and, at the same time, to supply the electric power to all the key telephone sets KT-1 through KT-m. For example, in the key telephone set KT-1, the electric power $V_2$ is supplyed to the power source output circuit KPW via power source $V_2 \rightarrow$ transformer T-11 $\rightarrow$ cable LN-11 $\rightarrow$ transformer T5 $\rightarrow$ power source circuit KPW $\rightarrow$ transformer T6 $\rightarrow$ cable LN-21 $\rightarrow$ transformer T-21 $\rightarrow$ ground. The output voltage $V_k$ of the power source circuit KPW is supplied to the key telephone set KT-1.

The key telephone sets KT-1 through KT-m are each comprised of a keyboard KEY including circuit selection keys, numeral designated keys, and key contacts such as * and #. They are further each comprised of a light-emitting diode LED serving as a display light to indicate the condition of use of a station line or an extension line, a hook switch HS, a display DIP based on liquid crystal, a control circuit KPU controlling a corresponding key telephone set KT, a read-only memory KOM, a random access memory KAM, a transmission-reception circuit KXR effecting exchange of signals with the key service unit ME, a talking circuit KSL, transformers T5 and T6, and a speaker SP.

The control circuit (processor) CPU of the key service unit ME is operated by a program stored in advance in the read-only memory ROM and the control circuits (processors) KPU of the key telephone sets KT-1 through KT-m are operated by programs stored in advance in each of the read-only memories KOM.

The conventional random access memory has system data stored therein. In the present embodiment, the system data are registered in the IC card and none or a very small portion of the system data are registered in the RAM. The IC card ICCD is electrically connected to the address bus, the data bus, and the control line in the key service unit ME through the medium of the connector 5 disposed in the main system ME so as to supply to the control circuit CPU such system data as required thereby. Thus, the memory capacity of the RAM can be reduced by eliminating the area otherwise required for the setting of system data and the capacity of the backup battery can be proportionally decreased. The IC card will be described in detail later.

The tone circuit TONE discharges the function of issuing dial tones, station incoming tones (call tones in the general incoming mode from the station line), extension incoming tones (call tones from some other key telephone set KT-j), lock-out tones, and hold tones. A PB dial oscillation circuit PBOSC generates PB dial data for transmission to the station line.

The control circuit CPU monitors the reception of calls at the station lines CO by making sequential reference to the incoming call detection circuits INC-1, ..., INC-n (not shown) each located in a corresponding one of the CO line circuits COT-1, ..., COT-n. A clock circuit CLK (not shown) discharges the function of clocking the time in which each key telephone set KT-i is engaged in a given call and the calling time (the duration between the time the incoming tone begins to sound and the time the call is answered), for example.

In the general incoming mode, the designation as to which one of the key telephone sets KT-1 through KT-m should be caused to sound a station call tone when a call arrives from the station line is stored in advance in the IC card ICCD. Here, it is assumed for the sake of description that the key telephone set KT-m is so designated.

While the system is operating in the general incoming mode, when an incoming call reaches one (CO-i) of the station lines CO-1, ..., CO-n, the incoming call detection circuit INC-i of the corresponding CO line circuit COT-i detects the information of the incoming call and transmits it to the control circuit CPU.

The control circuit CPU reads the key telephone set (KT-m in this case) designated to sound the station call tone from the IC card ICCD and, at the same time, reads out information on selection of the sound source, controls the talking network SW through the medium of the talking control circuit SWC, and transmits the corresponding sound tone from the tone circuit TONE to the key telephone set KT-m.

As a result, the station incoming tone peculiar to the key telephone set KT-m is issued from the speaker SP on the key telephone set KT-m side. At the same time, the light-emitting diode LED corresponding to the incoming station line is switched to steadily emit light.

When the keyboard KEY is operated to select the station line corresponding to the incoming call and the receiver is picked up to answer the call on the key telephone set KT-m side, the control circuit KPU of the key telephone set KT-m detects the information on station selection and the ON information of the hook switch HS and transmits an answering signal to the control circuit CPU on the key service unit ME side via the transmission-reception circuit KXR, the transformer T6 on the key telephone set side, and the transformer T-2m and the transmission-reception circuit XR on the key service unit ME side.

In response to the operation mentioned above, the control circuit CPU disconnects the tone circuit TONE from the talking network SW, causes the CO line circuit COT-i to form a loop, and connects the station line CO-i via the CO line circuit COT-i, the talking network SW, and the transformer T-1m to the talking circuit KSL of the key telephone set KT-m.

Thus, a talking route is formed between the station line CO-i and the key telephone set KT-m to permit talking on the station line.

Where the received call is desired to be transferred to some other key telephone set such as, for example, the station line KT-1, the hold key included in the keyboard KEY of the key telephone set KT-m is operated and, as a result, the tone circuit TONE is connected via the talking network SW to the CO line circuit COT-i in the state still retaining the station loop. Consequently, the tone circuit TONE issues a hold tone via the station line CO-i and the party receiving the hold tone discerns the hold state and stands by.

When the extension catch key included in the keyboard KEY is subsequently operated, the control circuit CPU controls the talking network SW to effect selection of an idle extension line and the tone circuit TONE issues an extension transmission tone (extension dial tone) to the talking circuit KSL of the key telephone set KT-m. The key telephone set KT-m, on confirming the extension transmission tone, dials the extension number of the party receiving the transfer. The information on this dialing is transmitted to the control circuit CPU of the key service unit ME. The control circuit CPU gains access to the RAM in the key service unit ME for the data corresponding to the key telephone set KT-1 and selects the key telephone set KT-1 being called via the talking network SW. As a result, the tone circuit TONE issues an extension call tone to the relevant extension loop.

When the key telephone set KT-1 selects the extension line corresponding to the arriving call and picks up the transmission-reception set in response to the call through the operation of the keyboard KEY, the control circuit KPU of the key telephone set KT-1 detects this information and transmits a response signal to the control circuit CPU of the key service unit ME. The control circuit CPU, on reception of this response signal, disconnects the tone circuit TONE from the talking network SW and stops the extension call tone. At the same time, the control circuit CPU forwards a control signal via the talking control circuit SWC to the talking network SW and interconnects the talking circuit KSL of the key telephone set KT-m and that of the called key telephone set KT-1 through the medium of the talking network SW.

Thus, an extension talking loop is formed and the key telephone set KT-m informs the called key telephone set KT-1 of the fact that the call has arrived from the station line. When the called key telephone set KT-1 depresses the station line button corresponding to the station line CO-i through the operation of the keyboard KEY, the information on this status is transmitted to the control circuit and the CO line circuit COT-i is relieved of the hold state mentioned above. As a result, the talking circuit KSL between the station line CO-i and the key telephone set KT-1 is closed to permit talking on the station line.

Now, the operation of the station transmission will be described. When the transmitter-receiver is picked up and the station line key is depressed to select a station line on the key telephone set KT-m side, the control circuit KPU of the key telephone set KT-m detects this fact and transmits a detection signal via the transmission-reception circuit KXR and the transformer on the key telephone set side and the transformer and the transmission-reception circuit XR on the key service unit ME side to the control circuit CPU. The control circuit CPU, in response thereto, causes the CO line circuit to form a loop and connects the station line via the CO line circuit, the talking network, and the transformer to the talking circuit KSL of the key telepone set KT-m which has effected the operation of transmission. Thus, a talking path is formed between the station line and the key telephone set KT-m.

When the work of dialing is carried out subsequently on the key telephone set KT-m, the control circuit CPU of the key service unit receives a dial information and gains access to the data corresponding to the key telephone set KT-m which is set in the RAM of the key service unit. By this access, the control circuit CPU reads the data of service class and confirms whether or not the dial information is consistent with the functions permitted for the service class.

The term "service class" is used for the purpose of defining the range in which the key telephone set is usable. Generally, the service class is divided into the five kinds, international transmission class, toll transmission class, special toll transmission class, local transmission class, and reception-only class. Where the local transmission is registered as the service class, for example, the system is capable of transmitting and receiving local phone calls but incapable of transmitting phone calls to any district outside the district of the local station, namely the phone calls of the specific toll transmission, the toll transmission, and the international transmission.

Where the requirement for service class is satisfied, the control circuit CPU of the key service unit reads the set data (dial data) of the abbreviated dial from the abbreviated code. When the data thus read out happen to be those of DP (dial pulse) dial, the dial data are transmitted to the CO line circuit. By turning on and off, the CO line circuit effects transmission of the DP dial to the station line. When the data happen to be those of PB (push button) dial, the control circuit CPU of the key service unit actuates the PB dial oscillation circuit PBOSC based on the set data mentioned above. The PB dial data fed out of the PB dial oscillation circuit is forwarded via the talking network SW and the CO line circuit COT to the station line.

When the received dial data are those of ordinary kind other than the abbreviated dial or automatic dial, the control circuit CPU of the key service unit forwards the dial data to the station line via the CO line circuit in case the dial data are those of DP dial or via the PB dial oscillation circuit, the talking network, and the CO line circuit in case the dial data are those of PB dial.

When the information fed in through the key of the key telephone set KT-m is not consistent with the functions permitted for service class, the control unit disconnects the CO line circuit COT from the talking network SW, connects the tone circuit TONE via the talking network and the transformer of the key service unit to the talking circuit of the key telephone set KT-m, and causes the tone circuit to issue a lock-out tone to the key telephone set KT-m.

Now, the data transmission-reception system between the key service unit ME and the individual key telephone sets KT will be described.

Figure 2:
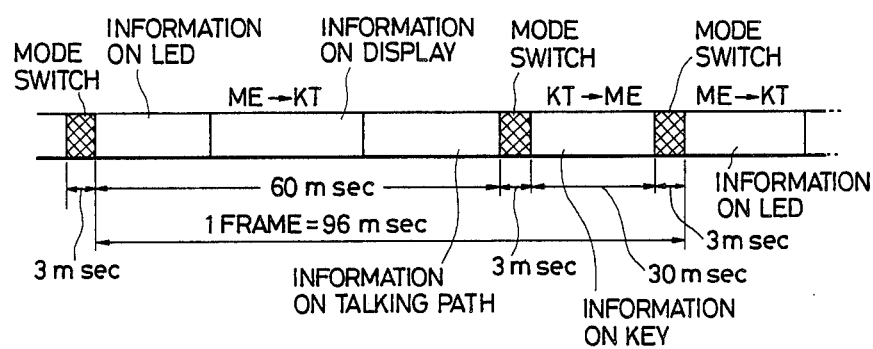
FIG. 2 is a diagram illustrating the format of transfer.

FIG. 2 illustrates the format for the transfer of one frame between the key service unit and the key telephone sets KT.

Between the transmission-reception circuit XR of the key service unit ME and the transmission-reception circuit KXR of the key telephone set KT-m, the information on LED, the information on display, and the information on talking path are sequentially transmitted from the key service unit to the key telephone set KT, in several tens of bytes. Subsequently, the mode is switched and the key telephone set KT transmits the information on key to the key service unit ME in tens of bytes. Thereafter, the mode is switched again and the former mode is executed again. In this manner, the two modes are alternated.

These pieces of the information serve as effective data when there occurs a change in status. In the absence of such a change in status, ineffective data are transmitted. The control circuits CPU and KPU, on receiving the effective data, begin to provide the functions of control.

This transfer of information is effected by repeating cycles of 96 m.sec per frame on the 1 m.sec/bit basis, for example.

The transfer of information from the key service unit ME to the key telephone set KT is effected by using cycles of 60-bits 60 m.sec and the transfer of information from the key telephone set KT to the key service unit ME by using cycles of 30-bits 30 m.sec, each involving a mode switch using cycles of 3-bits, 3 m.sec.

Figure 5:
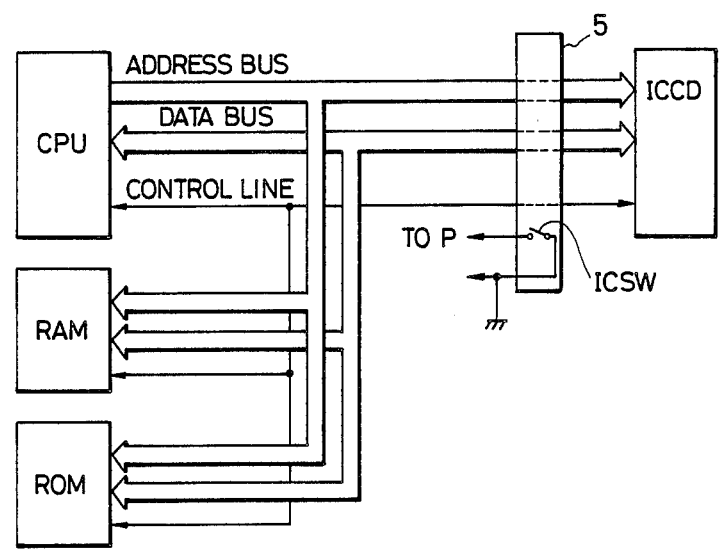
FIG. 5 is a block diagram illustrating electric connection between the key service unit and the IC card.
Figure 3:
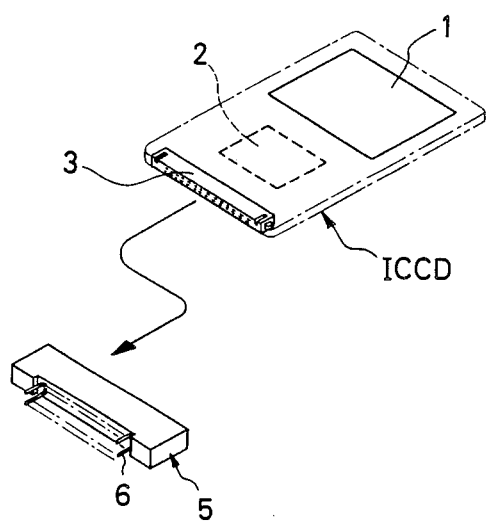
FIG. 3 is a perspective view illustrating an IC card and a connector.
Figure 4:
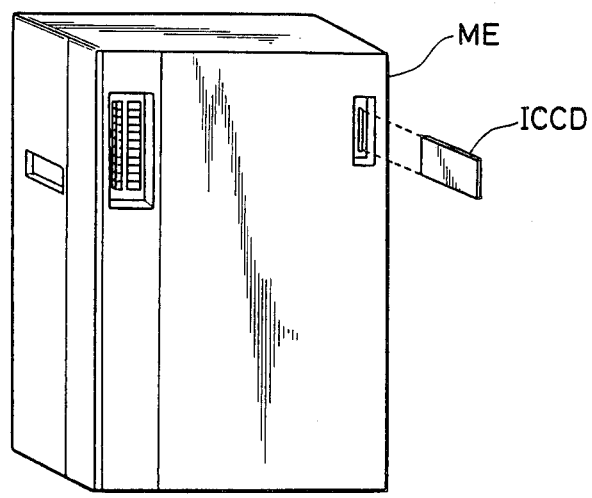
FIG. 4 is a perspective view illustrating an appearance of the key service unit adapted to enable the IC card to be set therein.

Now, the rough construction of the IC card ICCD and the manner of attachment (or connection) thereof to the key service unit ME will be described below with reference to FIG. 3, FIG. 4, and FIG. 5. FIG. 3 is a perspective view of the IC card ICCD and the connector, FIG. 4 is a perspective view illustrating the positional relation between a key service unit ME and the IC card ICCD to be attached thereto, and FIG. 5 is a block diagram illustrating the electric connection to be formed between the key service unit ME and the IC card ICCD when the IC card ICCD is inserted into the connector 5. From FIG. 5, it is clearly noted that the insertion of the IC card ICCD into the connector 5 establishes a mutual connection between the address bus, the data bus, and the control line inside the key service unit ME and the address bus, the data bus, and the control line in the IC card ICCD.

The IC card ICCD has roughly the size of a namecard and is composed, as illustrated in FIG. 3, of an embossed region available for inscription, an IC memory 2, and an electrode connector part 3 consisting of a plurality of contacts electrically connected to the memory 2. The connector 5 serving to connect the IC card mechanically and electrically to the key service unit ME is provided with a terminal for elastically nipping in position the electrode part 3 of the IC card, a switch ICSW, and a connection part 6 for connection to the bus inside the key service unit ME. This connector 5 is fixed at a stated position inside the key service unit ME. Optionally two connectors 5, one longitudinal type and the other lateral type, may be prepared and selectively used to suit the manner of use of the IC card.

An electrically erasable and programmable read-only memory (EEPROM) is used as the IC memory 2. Since the EEPROM of such a large capacity as 4 mega-bits has been recently made available, the use of EEPROM raises absolutely no problem from the standpoint of capacity. The connector 5 is adapted for exclusive use in the system contemplated herein. It serves to connect the data bus, the address bus, and the control line (for transmission of chip-select signal, read-write signal, etc) disposed inside the key service unit ME to the IC card ICCD. For example, an IC card made by Mitsubishi Electric Corp. and marketed under Product Code of MF4000 or MF500 may be adopted.

The connector 5 mentioned above is a connector used exclusively for the purpose of connecting the IC card ICCD to the data bus, the address bus, and the control line (for transmitting chip select signal and read-write signal).

In the IC card ICCD, the system data covering system functions, set system constants, line information, door phone, and security are registered.

Figure 6:
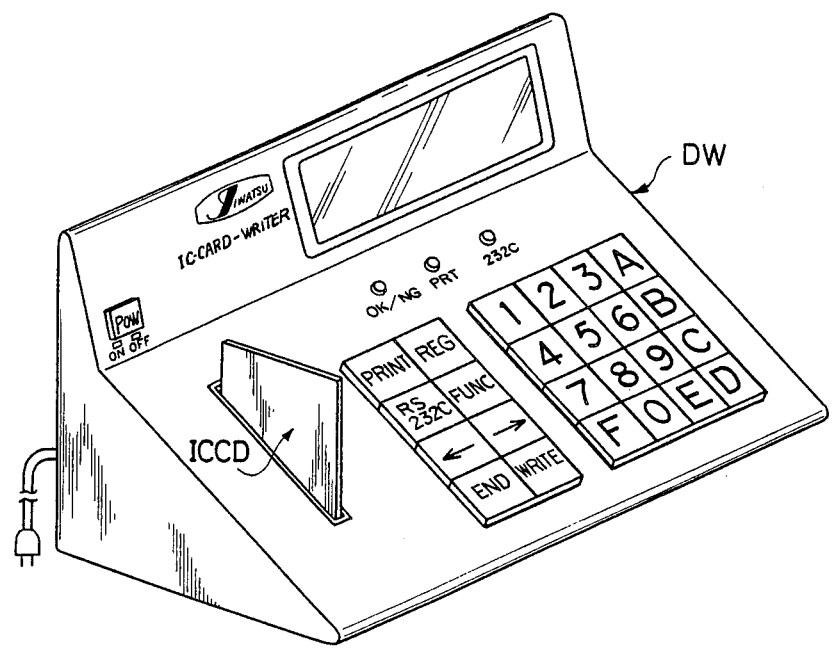
FIG. 6 is a perspective view illustrating an appearance of the device for registration of system data.

Now, the registration of system data in the IC card ICCD will be described below. FIG. 6 is a perspective view of an appearance of the data registration device DW used for registering system data in the IC card ICCD, FIG. 7 is a block diagram of the device DW for registration and FIG. B is a flow chart to aid in the description of the operation of system data registration.

Figure 7:
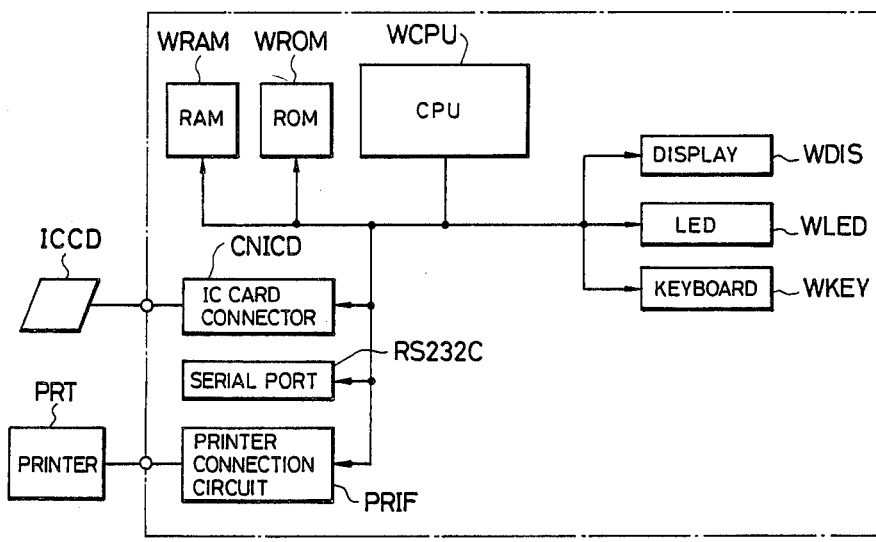
FIG. 7 is a block diagram of the device for registration.

As is clear from FIG. 6 and FIG. 7, the data registration device DW is provided with an exclusive IC card connector CNICD for permitting insertion therein of the IC card ICCD, a serial port RS 232 C for exchanging data with an externally disposed floppy disk or a personal computer, and a printer connection circuit PRIF for connection of an externally disposed printer PRT. It further has a display WDIS for displaying numerals and letters, a LED (WLED) for displaying a power source lamp and an error lamp, and a keyboard WKEY. It further has of a oontrol cirouit WCPU, a read-only memory WROM having a program memorized therein, a random access memory WRAM, and an address bus, a data bus, and a signal line for electrically connecting the various devices mentioned above.

Figure 8:
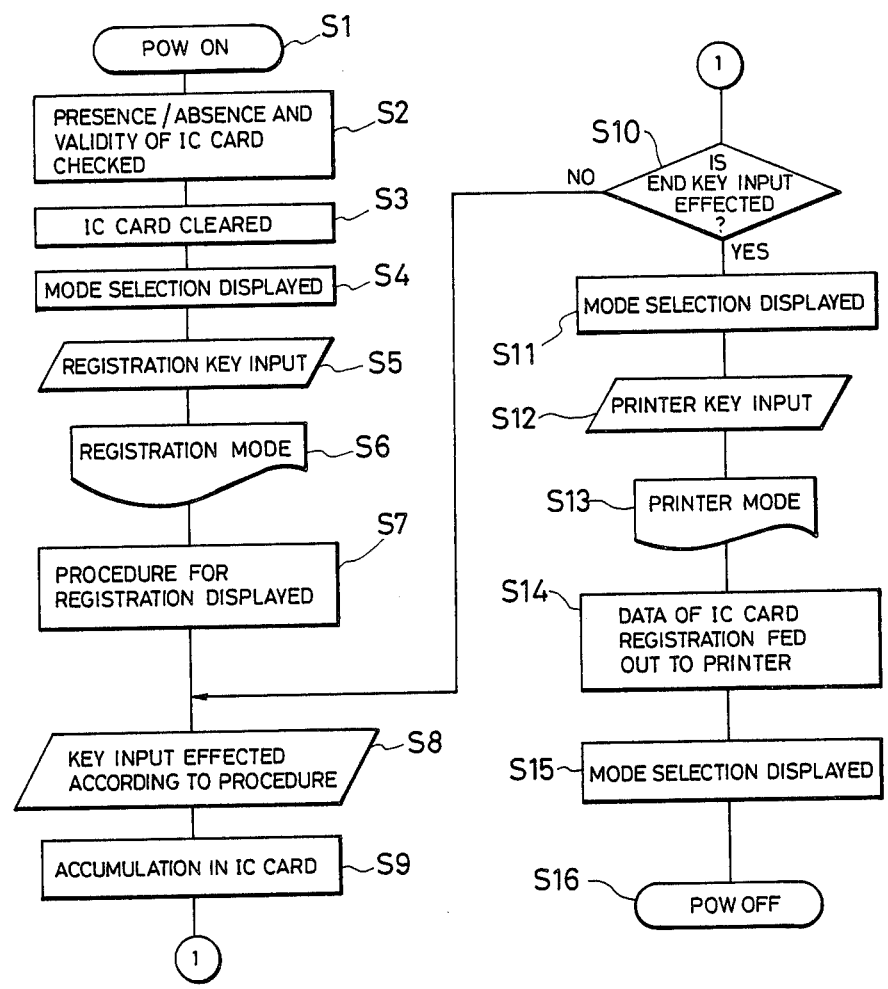
FIG. 8 is a flow chart meant to aid in the description of the operation of writing of system data in the IC card.

Now, the operation performed for the registration of system data will be described below with reference to FIG. 8. First, the power source switch POW of the data registration device WD is turned on (Step S1) to check the validity of the IC card ICCD inserted into the IC card connector CNICD (Step S2). If the IC card is not valid, an NG message is displayed on the display WDIS. The same display is made on the LED (WLED). Then, the contents stored in the IC card ICCD are cleared (Step S3).

Then, the registration or the selection of printer mode is displayed on the display WDIS (Step S4) and registration key is turned on the keyboard WKEY (Step S5). Consequently, the device is caused to assume the registration mode (Step S6). On the display WDIS, therefore, the procedure of registration is displayed (Step S7).

When the person effects a key input in accordance with the procedure of registration displayed on the display WDIS (Step S8), the control circuit WCPU detects this fact. Consequently, the data introduced are forwarded through a buffer BUFF (not shown) and stored sequentially in a fixed data size of 8 bits via the exclusive IC card connector CNICD in the relevant registers at the proper register addresses of the IC card (Step S9). For example, the following system data are specifically used for registration.

TABLE 1

| Kind of system data | Contents of registration Registered data | | |
|---|---|---|---|
| | Registration code | Station number code | Dial mode number |
| Dial mode by station line | 31 | 01 | 1 |
| 1: DP (10 PPS) | | 02 | 2 |
| 2: DP (20 PPS) | | 03 | 2 |
| 3: PB (ME) | | 10 | 3 |

TABLE 2

| Kind of system data | Contents of registration Registered data | | | | |
|---|---|---|---|---|---|
| | Registration code | Station number code | Sounding extension key telephone set KT number | Data (hexadecimal) | Address (hexadecimal) in IC card |
| Designation as to sounding of ring on arrival of station line | 32 | 01 | 01,02,03 | 07 | 1000 |
| | | | | 00 | 1001 |
| | | | | . | . |
| | | | | . | . |
| | | | | 00 | 1008 |
| | | 02 | 01,05,16 | 11 | 1009 |
| | | | | 80 | 100A |
| | | | | 00 | 100B |
| | | | | . | . |
| | | | | . | . |
| | | 03 | 10 | 00 | 1012 |
| | | | | 02 | 1013 |
| | | | | 00 | 1014 |
| | | | | . | . |
| | | | | . | . |
| | | 10 | 20,30,40 | 00 | 1059 |
| | | | | 00 | 105A |
| | | | | 08 | 105B |
| | | | | 20 | 105C |
| | | | | 80 | 105D |
| | | | | 00 | 105E |
| | | | | . | . |
| | | | | . | . |
| | | | | 00 | 1061 |

Now, the meaning of Table 2 will be explained. The data (hexadecimal) indicated in Table 2 are stored in a fixed data size of 8 bits as shown in FIG. 9 in the memory of the IC card. One address (hexadecimal) is attached to each set of the 8-bit data. Each of the bits in the data (hexadecimal) is made to correspond to the number of "sounding extension key telephone set KT", on the condition that the bit "1" represents "presence of sounding" and the bit "0" "absence of sounding." In the illustrated example, the 0~7 bits of the address 1000 correspond respectively to the numbers 01 through 08 of the extension key telephone sets KT. When a station line call arrives at the station line of the number code of 01, for example, the extension key telephone sets KT of Nos. 01, 02, and 03 are made to sound their bells.

The 8 bits of the data of the address 1001 correspond respectively to the extension telephone sets of Nos. 09 through 16. In this case, since all the component bits of the 8-bit data are invariably "0," it is understood that none of the extension telephone sets of Nos. 09 through 16 sound their rings when a station line call reaches the station line of code 01.

The 8 bits of the data of the address 1008 correspond respectively to the extension telephone sets of Nos. 65 through 72. In this case, since all the component bits of the 8-bit data are invariably "0," it is understood that the extension telephone sets of Nos. 65 through 72 do not sound their rings even when a station line call arrives at the station line code 01.

To each of the station line number codes 02 through 10, an address (hexadecimal) and a set of data (hexadecimal) are similarly assigned so as to effect registration of the extension key telephone sets KT which are to sound their rings at the time of arrival of a station line call.

Since one address is capable of designating the choice between presence and absence of the sounding of the rings of 8 extension key telephone sets KT, it ought to be plainly seen that Table 2 represents the case of using 72 extension key telephone sets.

Now, the description will be continued with reference again to FIG. 8. The control circuit WCPU forms a judgment as to whether or not the termination key is turned on (Step S10). When the judgment is for the affirmative, the system data are wholly entered into registers in the IC card ICCD. When Step S10 has "Yes" as an answer, the selection of mode is displayed again on the display WDIS (Step S11). When the person subsequently effects a printer key input (Step S12), the system assumes the printer mode (Step S13) and the system data registered in the IC card ICCD are read out into the printer PRT via being forwarded through the IC card connector CNICD and the printer connection circuit PRIF (Step S14). Thereafter, the mode selection is displayed again (Step S15). Finally, a series of processing is completed when the power source switch is turned off (Step S16).

In the processing described above the steps, S12 through S15, are not always necessary and may be omitted.

Where the system data mentioned above are stored in a floppy disc, simple and quick transfer of the system data from the floppy disc to the IC card ICCD is attained by inserting the IC card ICCD into the IC card connector and transferring the system data via the serial port RS232C to the IC card ICCD.

In consequence of the operation described above, the system data can be registered in the IC card ICCD.

When the IC card ICCD having the system data registered therein is inserted in the connector disposed in the key service unit ME illustrated in FIG. 1 or FIG. 4, the system data are read out of the IC card ICCD to contribute to the operation of the key telephone system.

Figure 10:
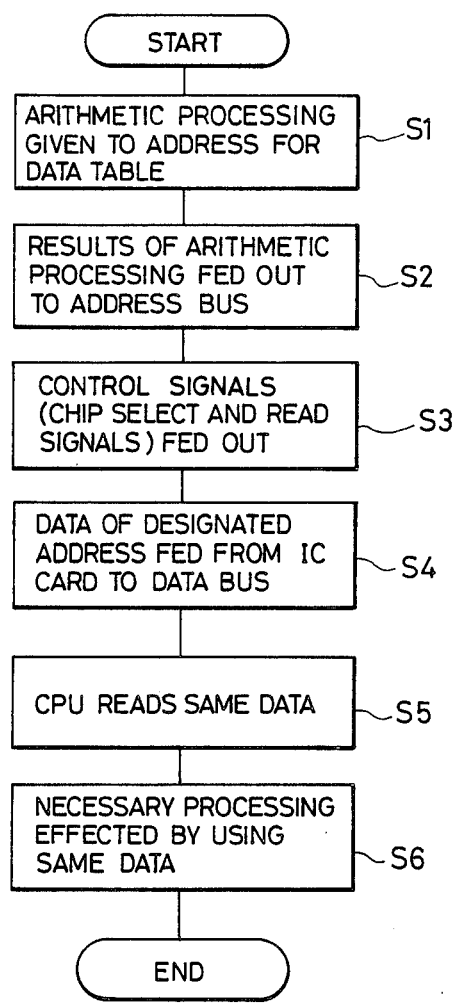
FIG. 10 is a flow chart illustrating the operation of the CPU of the key service unit during the reading of information from the IC card.

Now, the operation produced when the control circuit CPU on the key service unit ME side reads the system data from the IC card ICCD will be described below with reference to the flow chart of FIG. 10.

When the IC card ICCD is inserted into the connector disposed in the key service unit ME, the CPU first recognizes the registration code of the registered data indicated thereby to be read out and performs an arithmetic operation for the formation of an address within the IC card (Step S1). When the registered data in the IC card happen to be in the format shown in the table, for example, the "address of memory" shown in the table is subjected to arithmetic processing in the step S1 mentioned above.

Then, the CPU injects the results of this arithmetic processing into the address bus (Step S2). The CPU subsequently feeds out control signals (chip select signal and read signal) (Step S3). As the result, the data designated by the address mentioned above are read out of the IC card and delivered via the connector 5, and the data bus to the CPU (Step S4).

The CPU reads the data (Step S5) and gives the data necessary processing (Step S6), contributing to the operation of the key telephone system.

In accordance with the present embodiment, the writing of the system data in the IC card can be effected at any desired place at any desired time. So long as the IC card having the system data stored in advance therein is on hand, the system data desired by the user can be supplied to the key service unit ME simply by inserting this IC card in the connector of the key service unit ME after completion of the work for installation of the key telephone system. This arrangement, therefore, obviates the necessity for numerous pieces of system data to have to be registered one by one from a specific key telephone set after completion of the work of installation as in a conventional key telephone system. This fact leads to significant saving of time.

Where the system data happen to require alterations, the alteration of the system data can be effected very quickly by causing altered data to be stored in a new IC card with the aid of the data registration device DW, withdrawing the IC card from the key service unit ME, and inserting the new IC card instead. As compared with the conventional system, the time spent in keeping the key telephone set out of operation is significantly shorter in the key telephone system of this invention. The system data can be easily altered. It is no longer necessary to select the time for the system data alteration outside business hours such as, for example, on holidays or during the nighttime. The work of this alteration can be carried out with ease.

The embodiment described above represents a case in which the present invention is applied to a key telephone system comprising a key service unit and key telephone sets separated from the key service unit. This invention is not limited to the key telephone system of this particular configuration. Naturally, this invention can be applied to an independent telephone set or to the so-called parent key telephone system having a key service unit and key telephone sets arranged in an integrated manner. All such applications are embraced in the present invention.

As is clear from the foregoing description, this invention brings about the following effects.

(1) The system data can be quickly registered in the key service unit after completion of the work for installation of the key telephone system.

(2) When the system data happen to require alterations while the key telephone system is in service, the alterations can be accomplished with expedition.

(3) The system finds no use for any backup battery of a large capacity.

What is claimed is:

1. A key telephone system comprising a key service unit and a plurality of key telephone sets further comprising an IC card having a plurality of electrodes thereon electrically connected to an electrically erasable and programmable read-only memory (EEPROM) therein which has system data registered therein, and an IC card connector fixed in position wherein said key service unit and having a connection part therein electrically connected to an address bus, a data bus, and a control line provided in said key service unit, and further having a switch therein capable of controlling application of electrical power to said key service unit and said key telephone sets, said IC card connector adapted to receive therein, removably, said IC card selectively inserted therein so that said IC card electrodes are in electrical contact with said IC card connector connection part and so that said switch is actuated, wherein supply of said system data from said IC card to said key service unit is attained by inserting said IC card into said IC card connector to place said IC card electrodes in electrical contact with said IC card connector connection part and to actuate said switch so that electrical power is supplied to said key service unit permitting it to direct system data to appear on said address bus therein from said EEPROM.

2. The key telephone system according to claim 1, wherein said IC card connector permits said IC card to be freely attached thereto or detached therefrom.

* * * * *

UNITED STATES PATENT AND TRADEMARK OFFICE
CERTIFICATE OF CORRECTION

PATENT NO. : 4,782,514

DATED : November 1, 1988

INVENTOR(S) : Hironobu Oshikata et al.

It is certified that error appears in the above-identified patent and that said Letters Patent is hereby corrected as shown below:

Column 12, line 22, delete "wherein" and insert --within--.

Signed and Sealed this

Twenty-eighth Day of March, 1989

*Attest:*

DONALD J. QUIGG

*Attesting Officer*      *Commissioner of Patents and Trademarks*